US006471489B2

(12) United States Patent
Hua

(10) Patent No.: US 6,471,489 B2
(45) Date of Patent: Oct. 29, 2002

(54) SUPERSONIC 4-WAY SELF-COMPENSATING FLUID ENTRAINMENT DEVICE

(75) Inventor: Li Shan Hua, Ji Lin (CN)

(73) Assignee: Zhuhai Velocity of Sound Technology Ltd., Guangdong (CN)

(*) Notice: Subject to any disclaimer, the term of this patent is extended or adjusted under 35 U.S.C. 154(b) by 0 days.

(21) Appl. No.: 09/729,827

(22) Filed: Dec. 6, 2000

(65) Prior Publication Data

US 2001/0003275 A1 Jun. 14, 2001

(30) Foreign Application Priority Data

Dec. 10, 1999 (CN) .......................................... 99241052

(51) Int. Cl.[7] ................................................. F04F 5/44
(52) U.S. Cl. ........................ 417/198; 417/174; 417/178; 417/179; 417/183
(58) Field of Search .......................... 417/65, 118, 121, 417/123, 144, 145, 151, 163, 167, 168, 174, 178, 179, 183, 198

(56) References Cited

U.S. PATENT DOCUMENTS

| | | | | | |
|---|---|---|---|---|---|
| 1,437,819 | A | * | 12/1922 | Schmidt | ...................... 417/163 |
| 1,491,824 | A | * | 4/1924 | Schmidt | ...................... 417/174 |
| 3,045,897 | A | * | 7/1962 | Wood | |
| 3,625,820 | A | * | 12/1971 | Gluntz | ......................... 176/54 |
| 4,274,812 | A | * | 6/1981 | Elvidge et al. | .............. 417/179 |
| 4,595,344 | A | * | 6/1986 | Briley | ......................... 417/183 |
| 4,673,335 | A | * | 6/1987 | Nicodemus | .................. 417/174 |
| 4,810,170 | A | * | 3/1989 | Ide | .............................. 417/198 |
| 5,322,222 | A | * | 6/1994 | Lott | ............................. 417/198 |
| 6,138,456 | A | * | 10/2000 | Garris | ......................... 417/178 |
| 6,162,021 | A | * | 12/2000 | Sarshar et al. | .............. 417/174 |

* cited by examiner

Primary Examiner—Charles G. Freay
Assistant Examiner—John F Belena
(74) Attorney, Agent, or Firm—Blank Rome Comisky & McCauley LLP

(57) ABSTRACT

A self-compensating, energy saving heat transfer unit to provide an efficient means to transfer energy from steam to water in a central heating system. The steam enters a mixing chamber and creates a negative pressure environment. Water in a backwater pipe, which is at a lower temperature and pressure, is absorbed into the mixing chamber where energy is passed from the steam to the water. The water then leaves the first mixing chamber and enters a second mixing chamber where compensation water is added to make up for the possible loss of water that may occur in the central heating system. The heated water then exits the heat transfer unit and goes back into the central heating system. After being cooled in the central heating system, the water then reenters the heat transfer unit at the backwater pipe and continues the cycle over again.

7 Claims, 1 Drawing Sheet

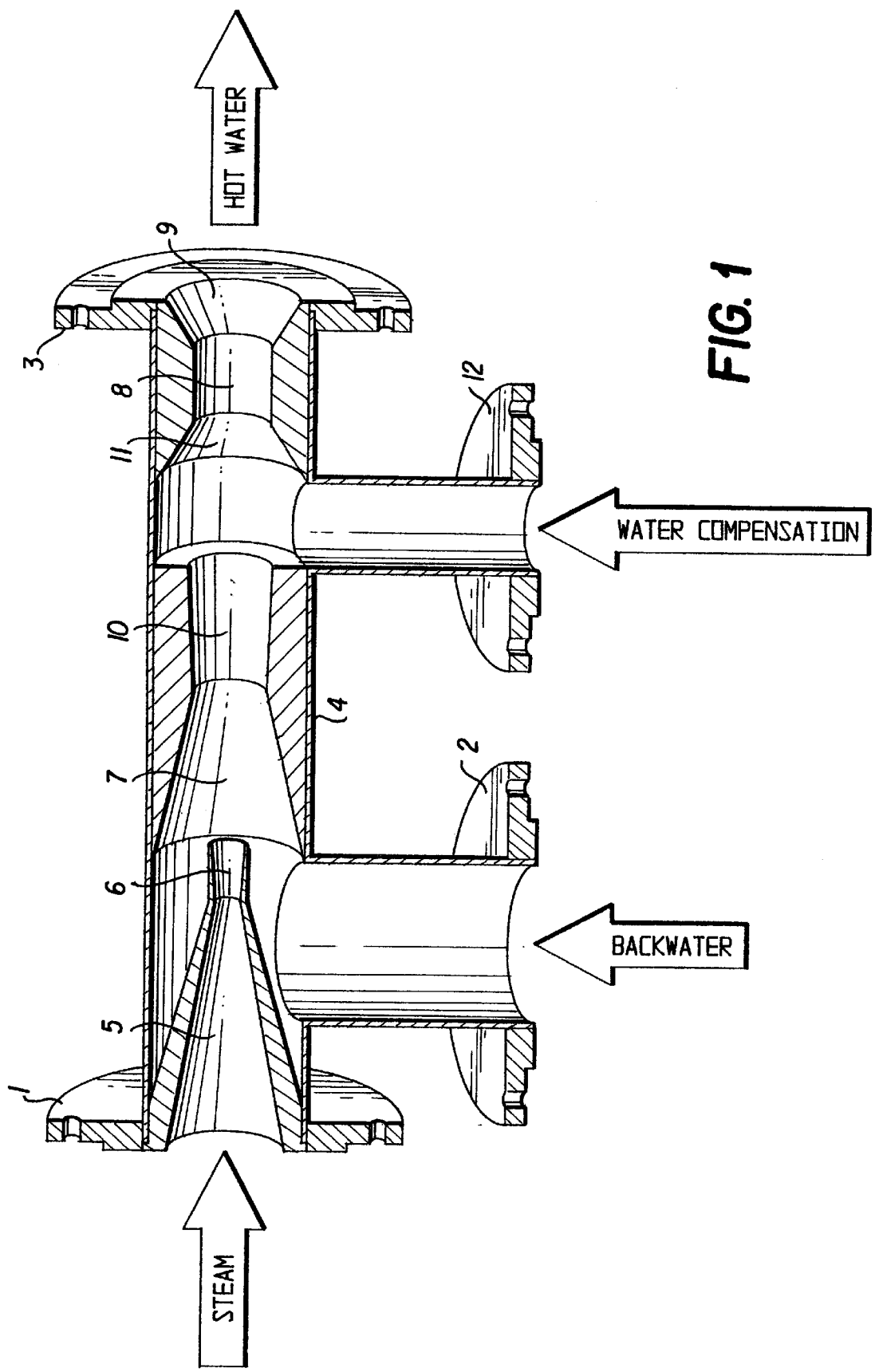

SUPERSONIC 4-WAY SELF-COMPENSATING FLUID ENTRAINMENT DEVICE

This is an invention of heating equipment, to be specific, it is a supersonic 4-way self-compensating fluid entrainment device.

Ordinary central heating systems realize central heating supply to users by making use of a circulating pump to keep the water in a user system circulating continuously and at the same time heating the circulating water with steam through a thermal converter. The water in such systems is indirectly heated by a thermal source of steam, thus the thermal efficiency is relatively low. The kinetic energy (pressure of steam), another half of the energy in the steam is wasted in the system, in particular.

This invention is designed to solve the above-mentioned problems by providing a super energy-saving unit with supersonic 4-way self-compensation.

The feature of this super unit is composed of a flange at the steam inlet, a flange at the backwater intake, a flange at the water exit, a flange at the water compensation inlet and a main body. The flange at the steam inlet is connected with the body. Close to the inlet flange inside the body there is a nozzle with a critical jet at its tip. Close to the jet there is a mixing chamber which is followed by a second jet at the end of the chamber. Close to the second jet there is a second mixing chamber, which is linked with a mixing tube to a diffusion cubicle. The cubicle is connected with the water exit flange. The backwater intake flange is connected with the body at the nozzle. Water compensation inlet flange is connected with the body between the second jet and second mixing chamber.

Both nozzle, mixing chamber and second mixing chamber are funnel like and the critical jet is trumpet shaped while the mixing tube is a circular tube and both the second jet and diffusion cubicle are in an expanded bell shape.

This invention is a heating and compressing unit powered by steam. The steam with certain pressure ejects from the jet at a very high speed and comes into the mixing chamber. Meanwhile, the pressure is reduced at the exit of the jet, producing a negative pressure, with which the water at low temperature and pressure from backwater pipe is absorbed into the chamber. Exchange of heat and momentum between the two flows is carried out in the chamber, namely, steam passes heat to the backwater to increase water temperature and passes momentum and energy to the backwater to increase pressure and potential energy.

When leaving the mixing chamber and passing through the second jet the mixed flow has become hotter water at a uniform speed. Water shall be compensated due to certain loss of water in the circulating process of the heating system. Water compensated from the compensation inlet flange shall mix with hot water in the second mixing chamber before entering into the diffusion cubicle, reducing its flow gradually while rising its pressure continuously. As result, hotter water with certain pressure and temperature is obtained. Under the action of pressure the hot water feeds into the thermal circulation system from the water exit for heat supply, and then enters into this energy-saving unit from backwater intake and continues circulation and heat supply after the water temperature drops. Thanks to direct contact between the thermal source of steam and the water to be heated the thermal efficiency is improved, especially, the system makes full use of another half of the energy—kinetic energy (steam pressure), directly converting it into the pressure to drive the heated water and continue its self-circulation. As a result, the design of the invention alleviates the need for a mechanical circulating pump, reducing the overall cost of operating a central heating system.

FIG. 1 A sectional view of the invention's structure.

As shown in the figure are steam inlet flange 1, backwater intake flange 2, water exit flange 3, the main body 4, funnel-shaped nozzle 5, trumpet-like critical jet 6, funnel-shaped mixing chamber 7, circular mixing tube 8, expanded bell-shaped diffusion cubicle 9, second jet 10, second mixing chamber 11, and water compensation inlet flange 12.

This supersonic 4-way self-compensating super energy-saving system is composed of a flange at the steam inlet 1, a flange at the backwater intake 2, a flange at the water exit 3, water compensation inlet flange 12 and main body 4. The flange at the steam inlet 1 is connected with the body 4. Close to the steam inlet flange 1 inside the body 4 there is a funnel-shaped nozzle 5 with a trumpet-like critical jet 6 at its tip. Close to the jet 6 there is a funnel-shaped mixing chamber 7 with a second jet 10 at its tip. Close to the second jet 10 there is a second mixing chamber 11 which is linked with a circular mixing tube 8 to an expanded bell-shaped diffusion cubicle 9. The cubicle 9 is connected with the water exit flange 3. The backwater intake flange 2 is connected with the body 4 at the funnel-shaped nozzle 5. Water compensation inlet flange 12 is connected with the body 4 between the second jet 10 and the second mixing chamber 11.

This unit is expected to be widely used in thermal and heated water supply systems both in industrial and civil buildings and it is fully possible to replace the traditional thermal converters and circulating pumps.

In the mixing process of steam and water inside the body of the invention the mixed fluid can reach a supersonic speed due to the increase of the compression coefficient and both fluids shall not consume mechanical energy in the transmission process of thermal energy and kinetic energy. Heating and compressing are carried out in a short instant, finally, realizing the purpose of fluid heating and compressing.

What is claimed is:

1. A supersonic 4-way self-compensating fluid entrainment device comprising:
    a main body having a steam inlet, a backwater intake, a water compensation inlet, and a water exit;
    a funnel-shaped nozzle with a critical first jet at its tip located inside the body proximate to the steam inlet, a first mixing chamber located adjacent to the first jet, a second jet located adjacent to the first mixing chamber, a second mixing chamber located adjacent to the second jet, a mixing tube located adjacent to the second mixing chamber, and a diffusion cubicle located adjacent to the mixing tube;
    a steam inlet flange connected to the main body adjacent to the steam inlet, a backwater intake flange connected to the body at a nozzle, a water compensation inlet flange connected to the body between the second jet and second mixing chamber, and a water exit flange connected to the body adjacent to the diffusion cubicle.

2. The supersonic 4-way self-compensating fluid entrainment device of claim 1, wherein the critical first jet is trumpet-shaped.

3. The supersonic 4-way self-compensating fluid entrainment device of claim 1, wherein the first mixing chamber is funnel-shaped.

4. The supersonic 4-way self-compensating fluid entrainment device of claim 1, wherein the second jet is bell-shaped.

5. The supersonic 4-way self-compensating fluid entrainment device of claim 1, wherein the second mixing chamber is funnel-shaped.

6. The supersonic 4-way self-compensating fluid entrainment device of claim 1, wherein the mixing tube is circular.

7. The supersonic 4-way self-compensating fluid entrainment device of claim 1, wherein the diffusion cubicle is bell-shaped.

* * * * *